United States Patent Office 3,477,863
Patented Nov. 11, 1969

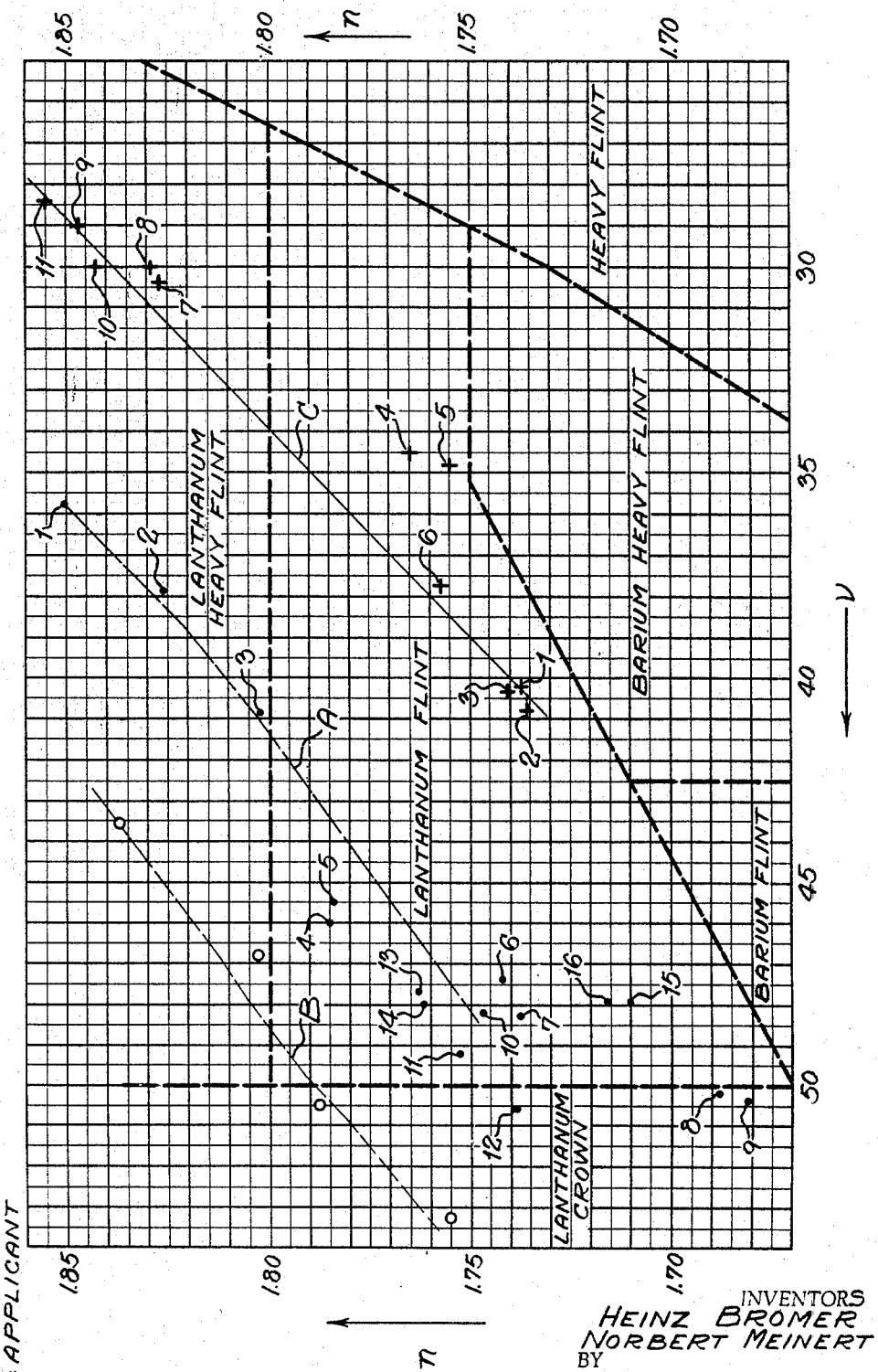

3,477,863
HEAVY FLINT GLASSES
Heinz Bromer, Hermannstein, and Norbert Meinert, Wetzlar (Lahn), Germany, assignors to Ernst Leitz, G.m.b.H., Wetzlar (Lahn), Germany
Continuation of application Ser. No. 197,849, May 28, 1962. This application Sept. 18, 1964, Ser. No. 397,529
Int. Cl. C03c 3/10, 3/30
U.S. Cl. 106—54                                         6 Claims

ABSTRACT OF THE DISCLOSURE

Optical glass having a refractive index of from approximately 1.735 to approximately 1.86 and an Abbe number of from approximately 41.1 to approximately 28. The glass consists essentially of in parts by weight from about 12% to about 20% silicon dioxide, from about 8% to about 20% boron oxide, the combined total of silicon dioxide and boron oxide being from about 26% to about 33%, from about 5% to about 20% zinc oxide, up to about 7.5% cadmium oxide, the total of zinc oxide and cadmium oxide being from about 6.5% to about 20% from about 10% to about 24% barium oxide, up to about 5% magnesium oxide, up to about 10% strontium oxide, up to about 25% calcium oxide, the total of the oxides of barium, magnesium, calcium and strontium being from about 14% to about 46%, from about 4.0% to about 7.5% zirconium oxide, and from about 6.5% to about 25% titanium dioxide, up to about 20% lanthanum oxide, and up to about 5% alkali oxides.

This application is a continuation of our copending application Ser. No. 197,849, filed May 28, 1962 now abandoned.

The present application relates to optical glasses, more particularly to glasses for the corrective or dispersive lenses of lens systems to meet the requirements of the lens computer.

Because of the color dispersion of glasses each objective for photographic, telescopic or microscopic systems must be composed of lens components of glasses of different color dispersion, one lens component for example, being a condensing lens for bringing the light rays to a focus and the other lens being a correcting lens for correcting the chromatic aberration caused by the color dispersion of the condensing lens. In very fine lenses, there may be several lenses or lens components. However, since the optical aberrations of optical systems consist not only of chromatic aberrations but also of aberrations which are generated through the curvature of the lenses (spherical aberrations) it is necessary to take into account these latter aberrations. These aberrations are the smaller the smaller of the curvature of the lens system. To obtain the smallest curvature a glass with the highest possible refractive force or refractive index, $n$, must be selected. This requirement led to the development of the lanthanum crown- and lanthanum-flint glasses which occurred after the second world war, although the favorable properties of lanthanum oxide in such glasses had already been discovered shortly before the second world war. In the accompanying drawing based on the catalog of Jenaer Glasswerk Schott and Gen showing the section solely on the $n=\nu$ diagram, the new development is set forth. All glasses which are within the outlines lanthanum crown, lanthanum flint and lanthanum heavy flint, are of the after-the-war development.

To remove the chromatic aberration it is advantageous to select, for the condensing lens component and for the dispersion lens component glasses whose dispersion values expressed as Abbe number $\nu$ are respectively in about the ratio of 1.5:1. The Abbe number is an inverse expression of the dispersion values and in the above ratio the dispersion of the glass of the condensing lens is less than that of the glass of the dispersion lens.

For the dispersion lenses, until most recent times, only the heavy flint glasses were available. If one wished to have a high index of refraction, $n$, for glasses for condensing lenses, such as are given in British Patent No. 686,708, the evolution of glasses for the correction of dispersion in order to meet the requirements of the ratio of $\nu$ values stated above become necessary.

In the drawing accompanying this specification the glasses of this British patent are represented by dots (.). At each dot is a number which corresponds with the number in the first column of the table on page 2 of this British patent specification. A line A gives the mean of the optical values, $n$ and $\nu$, of these glasses. Each of the glasses fulfills practically the requirement to give, in combination with the heavy flint glasses, the desired $\nu$ ratio when, for the two selected glasses, the index of refraction is about the same.

More recent developments, however, have led to glasses which are designated in the drawing by the circles O. Only three of these glasses are given in the catalog and indicated on the drawing as it is customary to make but a few of the large number of glasses possible. The $n$ values for these glasses are higher than those of the British Patent 686,708 for the same $\nu$ values, or reversely Abbe numbers $\nu$ are higher for the same $n$ values. The average line for the mean values of these glasses is shown at B and is to the left of the line A for the glasses of the British Patent 686,708. It may be noted that the middle glass is somewhat to the right of the line while the end glasses are close to it. If one is to use these glasses for condensing lenses, then there is, at the same time the requirements, for the dispersion lens, to use glasses whose $\nu$-values lie higher than those of the heretofore known heavy flint glasses, which lie in the region indicated in the accompanying drawing, and at approximately the line C of the drawing, to the left of the heavy flint region. Our present invention is directed to glasses having values approximately in the region along this line. This line lies to the right of line A and for glasses of equal $n$-values, the Abbe numbers $\nu$ are from seven to eight units to the right, or lower, or reversely for the same Abbe number the $n$ values are six to seven units lower in the second place from the period in the $n$ values.

The glasses of our invention have a glass base of $SiO_2$ and $B_2O_3$ within certain limits together with oxides of the alkaline earth metals, CaO, BaO and SrO, and in some glasses oxides of the alkali metals, $Li_2O$, $Na_2O$ and $K_2O$. The glasses also contain ZnO, CdO, $La_2O_3$, $ZrO_2$ and $TiO_2$ and the variation in the various $n$ and $\nu$ values are obtained by changes in the ratio of the total amount of CdO and ZnO to $TiO_2$ and by the changes in the amount of $TiO_2$.

In particular it has been found that the portion in the mixture of:

|  | Percent by wt. |
|---|---|
| $SiO_2$ | 12–20 |
| $B_2O_3$ | 8–20 | should amount to between 26 and 33 percent by weight of the sum of the glass formers. The portions of oxides of the alkaline earths should total between 14 and 46 percent by weight of which:

|  | Percent by wt. |
|---|---|
| MgO equals | 0–5 |
| CaO equals | 0–25 |
| SrO equals | 0–10 |
| BaO equals | 10–24 |

Alkali oxides can be contained up to 5 percent by weight of the mixture.

The amount of ZnO and/or CdO should amount to at least 6.5 percent by weight of which:

| | Percent by wt. |
|---|---|
| ZnO equals | 5–20 |
| CdO equals | 0–7.5 |

Moreover the mixture contains:

| | Percent by wt. |
|---|---|
| $ZrO_2$ | 4–7.5 |
| $TiO_2$ | 6–25.0 |
| $La_2O_3$ | 0–20.0 |

Preferably in accordance with the invention, it is proposed that mixtures for various groups of optical values be defined according to Table 1.

Additions of arsenic, antimony and/or tellurium compounds to influence the color are provided.

It may be noted that the glasses at the lower $n_e$ value of about 1.74 and higher $\nu_e$ of 40.2–40.8 have a ZnO/CdO content of 10.2–18.5% and a $TiO_2$ content of 7.4–8.4 while the glasses of higher $n_e$ value of 1.842 to 1.8549 have a ZnO/CdO content of 11.0 to 12.5% while the $TiO_2$ content is from 20 to 21%, and between these values the $n_e$ value increases with an increase of the $TiO_2$ content and generally a decrease in the content of ZnO/CdO. It may be noted also that glasses 4 and 5 which deviate to the right of the line C have a higher $TiO_2$ content together with a lower ZnO/CdO content than glass 6, close to the line C, and of approximately the same $n$ value, illustrating the effect of an increase TABLE 1
(In parts by weight)

| | | | | | | |
|---|---|---|---|---|---|---|
| $n_e$ | 1.735–1.737 | 1.75–1.77 | 1.75–1.76 | 1.827–1.83 | 1.843–1.847 | 1.85–1.86 |
| $\nu_e$ | 40.3–41.1 | 34.4–34.9 | 37–38 | 30–32 | 29–30 | 28–29.5 |
| Glass formers | 29.5–32.5 | 29.5–30 | 31.2 | 26–27.5 | 26–27.5 | 26.5 |
| $SiO_2/B_2O_3$ | 1.55–0.8 | 0.8–0.82 | 0.8–0.82 | 1.7–1.9 | 1.7–1.8 | 1.8 |
| Alkaline earth oxides | 34–46 | 30.5–31.5 | 32–33 | 14.5–23.5 | 15–23 | 16 |
| Alkali oxides | | 3.0–4.5 | | 0–3 | 0–2 | 2 |
| ZnO/CdO | 8.5–20.0 | 14.0–16.0 | 19–20 | 13–17.5 | 11–16 | 12.5 |
| $ZrO_2$ | 6.5–7.5 | 6.3–6.7 | 6.5–6.7 | 4–5 | .5 | 5 |
| $TiO_2$ | 6.5–8.5 | 14.0–15.0 | 10 | 15–18.5 | 18–20 | 20 |
| $La_2O_3$ | | | | 13–20 | 12.5–18.5 | 17.5 |

It may be noted that the position of the glasses in the middle range follows a deviation from the average line similar to that of the glasses of the Schott catalog.

The composition for glasses with $n_e=1.75$ to 1.76 is given for two types with lesser and greater dispersions. The type of modifications in the composition is accomplished in the same sense for every other group: thus combinations for glasses with optical values which lie between those given in these tables are obtained by interpolation. In Table 2 a number of glasses are listed whose melt compositions are assembled, according to the invention, in which these examples are illustrative and not limiting of the inventive idea.

of $TiO_2$ content relative to the ZnO/CdO content in varying the dispersion relative to the refractive index. Such variations may be made to provide a glass having a refraction-dispersion relation to meet any requirement of the lens computer such as may be occasioned by a similar variation of the glass of the condensing lens component from line B.

What we claim is:

1. Optical glass having a refractive index of from approximately 1.735 to approximately 1.737 and an Abbe number of from approximately 40.3 to approximately 41.1, said glass consisting essentially of in parts by weight from about 12% to about 20% silicon dioxide, from about 8%

TABLE 2
[In parts by weight]

| | Melt number | | | | | | | | | | |
|---|---|---|---|---|---|---|---|---|---|---|---|
| | LAF/ Ti 10 | LAF/ Ti 14 | LAF/ Ti 15 | LAF/ Ti 19 | LAF/ Ti 24 | LAK P49/ Ti Al | PPF1/ Ti 4 | PPF1/ Ti 27 | PPF1/ Ti 16 | PPF1/ Ti 36 | PPF1/ Ti 29 |
| $SiO_2$ | 14.5 | 14.5 | 14.5 | 13.2 | 13.2 | 14.0 | 17.0 | 17.0 | 17.0 | 17.0 | 17.0 |
| $B_2O_3$ | 17.7 | 15.2 | 17.7 | 16.2 | 16.2 | 17.2 | 9.7 | 9.0 | 9.5 | 9.5 | 9.5 |
| $Li_2O$ | | | | | | | | | | 1.5 | 1.5 |
| $Na_2O$ | | | | | | | 2.9 | 2.0 | 2.0 | | |
| $K_2O$ | | | | 3.0 | 4.5 | | | | | 0.5 | 0.5 |
| CaO | 22.9 | 17.9 | 22.9 | 16.4 | 16.4 | 17.3 | | | 5.0 | 7.5 | 2.5 |
| BaO | 15.0 | 21.0 | 11.5 | 14.6 | 14.6 | 15.6 | 14.6 | 23.5 | 14.0 | 15.5 | 14.0 |
| SrO | | 7.0 | | | | | | | | | |
| ZnO | 14.7 | 10.2 | 13.5 | 15.8 | 14.3 | 19.2 | 15.5 | 13.0 | 11.5 | 11.0 | 12.5 |
| CdO | | | 5.0 | | | | | | | | |
| $La_2O_3$ | | | | | | | 18.0 | 13.0 | 15.0 | 12.5 | 17.5 |
| $ZrO_2$ | 6.8 | 6.8 | 7.5 | 6.3 | 6.3 | 6.7 | 4.8 | 4.0 | 5.0 | 5.0 | 5.0 |
| $TiO_2$ | 8.4 | 7.4 | 7.4 | 14.5 | 14.5 | 10.0 | 17.5 | 18.5 | 21.0 | 20.0 | 20.0 |
| $n_e$ | 1.7373 | 1.7357 | 1.7404 | 1.7647 | 1.7546 | 1.7568 | 1.8272 | 1.8292 | 1.8464 | 1.8427 | 1.8549 |
| $\nu_e$ | 40.2 | 40.8 | 40.3 | 34.5 | 34.8 | 37.7 | 30.4 | 30.0 | 29.0 | 30.0 | 29.4 |
| Identity No | (1) | (2) | (3) | (4) | (5) | (6) | (7) | (8) | (9) | (10) | (11) |

The glasses of the invention have very good properties for processing. They may be satisfactorily ground and polished by the usual methods. They are not significantly sensitive to spotting and are chemically resistant so that the application of reflection lessening films can take place without difficulty. The titanium color occassionally occurring with glasses of high titanium oxide content may be extensively reduced by quick cooling. The density of the glasses is at most two thirds of that of lead-containing glasses of equal indices of refraction so that even with the lanthanum oxide containing glasses the higher price is made competitive through the decreased density.

The mixes are advantageously melted down in platinum vessels. After melting, at 1250 to 1350° C., the mixes are refined for a short time at 1350 to 1380° C., then homogenized at 1250. After stirring to 1050 to 1150° C. the glasses are cast in not too strongly preheated steel molds. The tempering process concludes the casting.

to about 20% boron oxide, the combined total of silicon dioxide and boron oxide being from about 29.5% to about 32.5%, the weight ratio $SiO_2/B_2O_3$ being about 1.55–0.8, from about 5% to about 20% zinc oxide, up to about 7.5% cadmium oxide, the total of zinc oxide and cadmium oxide being from about 6.5% to about 20%, from about 10% to about 24% barium oxide, up to about 5% magnesium oxide, up to about 10% strontium oxide, up to about 25% calcium oxide, the total of the oxides of barium, magnesium, calcium and strontium being from about 34% to about 46%, from about 6.5% to about 7.5% zirconium oxide, and from about 6.5% to about 8.5% titanium dioxide, the glass being substantially free of alkali oxides and lanthanum oxide.

2. Optical glass having a refractive index of from approximately 1.75 to approximately 1.77 and an Abbe number of from approximately 34.4 to approximately 34.9, said glass consisting essentially of in parts by weight from about 12% to about 20% silicon dioxide, from about 8% to about 20% boron oxide, the combined total of silicon dioxide and boron oxide being from about 29.5% to about 30%, the weight ratio $SiO_2/B_2O_3$ being about 0.8–0.82, from about 5% to about 20% zinc oxide, up to about 7.5% cadmium oxide, the total of zinc oxide and cadmium oxide being from about 14% to about 16%, from about 10% to about 24% barium oxide, up to about 5% magnesium oxide, up to about 10% strontium oxide, up to about 25% calcium oxide, the total of the oxides of barium, magnesium, calcium and strontium being from about 30.5% to about 31.5%, from about 6.3% to about 6.7% zirconium oxide, from about 14.0% to about 15.0% titanium dioxide, and from about 3.0% to about 4.5% alkali oxides, the glass being substantially free of lanthanum oxide.

3. Optical glass having a refractive index of from approximately 1.75 to approximately 1.76 and an Abbe number of from approximately 37 to approximately 38, said glass consisting essentially of in parts by weight from about 12% to about 20% silicon dioxide, from about 8% to about 20% boron oxide, the combined total of silicon dioxide and boron oxide being from about 31.2%, the weight ratio $SiO_2/B_2O_3$ being about 0.8–0.82, from about 5% to about 20% zinc oxide, up to about 7.5% cadmium oxide, the total of zinc oxide and cadmium oxide being from about 19% to about 20%, from about 10% to about 24% barium oxide, up to about 5% magnesium oxide, up to about 10% strontium oxide, up to about 25% calcium oxide, the total of the oxides of barium, magnesium, calcium and strontium being from about 32% to about 33%, from about 6.5% to about 6.7% zirconium oxide, and about 10% titanium dioxide, the glass being substantially free of alkali oxides and of lanthanum oxide.

4. Optical glass having a refractive index of from approximately 1.827 to approximately 1.83 and an Abbe number of from approximately 30 to approximately 32, said glass consisting essentially of in parts by weight from about 12% to about 20% silicon dioxide, from about 8% to about 20% boron oxide, the combined total of silicon dioxide and boron oxide being from about 26% to about 27.5%, the weight ratio $SiO_2/B_2O_3$ being about 1.7–1.9, from about 5% to about 20% zinc oxide, up to about 7.5% cadmium oxide, the total of zinc oxide and cadmium oxide being from about 13% to about 17.5%, from about 10% to about 24% barium oxide, up to about 5% magnesium oxide, up to about 10% strontium oxide, up to about 25% calcium oxide, the total of the oxides of barium, magnesium, calcium and strontium being from about 14.5% to about 23.5%, from about 4% to about 5% zirconium oxide, from about 15% to about 18.5% titanium dioxide, and from about 13% to about 20% lanthanum oxide, and up to about 3% alkali oxides.

5. Optical glass having a refractive index of from approximately 1.843 to approximately 1.847 and an Abbe number of from approximately 29 to approximately 30, said glass consisting essentially of in parts by weight from about 12% to about 20% silicon dioxide, from about 8% to about 20% boron oxide, the combined total of silicon dioxide and boron oxide being from about 26% to about 27.5%, the weight ratio $SiO_2/B_2O_3$ being about 1.7–1.8, from about 5% to about 20% zinc oxide, up to about 7.5% cadmium oxide, the total of zinc oxide and cadmium oxide being from about 11% to about 16%, from about 10% to about 24% barium oxide, up to about 5% magnesium oxide, up to about 10% strontium oxide, up to about 25% calcium oxide, the total of the oxides of barium, magnesium, calcium and strontium being from about 15% to about 23%, about 5% zirconium oxide, from about 18% to about 20% titanium dioxide, and from about 12.5% to about 18.5% lanthanum oxide, and up to about 2% alkali oxides.

6. Optical glass having a refractive index of from approximately 1.85 to approximately 1.86 and an Abbe number of from approximately 28 to approximately 29.5, said glass consisting essentially of in parts by weight from about 12% to about 20% silicon dioxide, from about 8% to about 20% boron oxide, the combined total of silicon dioxide and boron oxide being from about 26.5%, the weight ratio $SiO_2/B_2O_3$ being about 1.8, from about 5% to about 20% zinc oxide, up to about 7.5% cadmium oxide, the total of zinc oxide and cadmium oxide being about 12.5% from about 10% to about 16% barium oxide, up to about 5% magnesium oxide, up to about 10% strontium oxide, up to about 10% calcium oxide, the total of the oxides of barium, magnesium, calcium and strontium being about 16%, about 5% zirconium oxide, about 20% titanium dioxide, about 17.5% lanthanum oxide, and about 2% alkali oxides.

References Cited

UNITED STATES PATENTS 2,971,854   2/1961   Geffeken _____ 106—54

FOREIGN PATENTS 686,708   1/1953   Great Britain.
55,355   9/1943   Netherlands.

HELEN M. McCARTHY, Primary Examiner

U.S. Cl. X.R.

350—176